Figure 1:
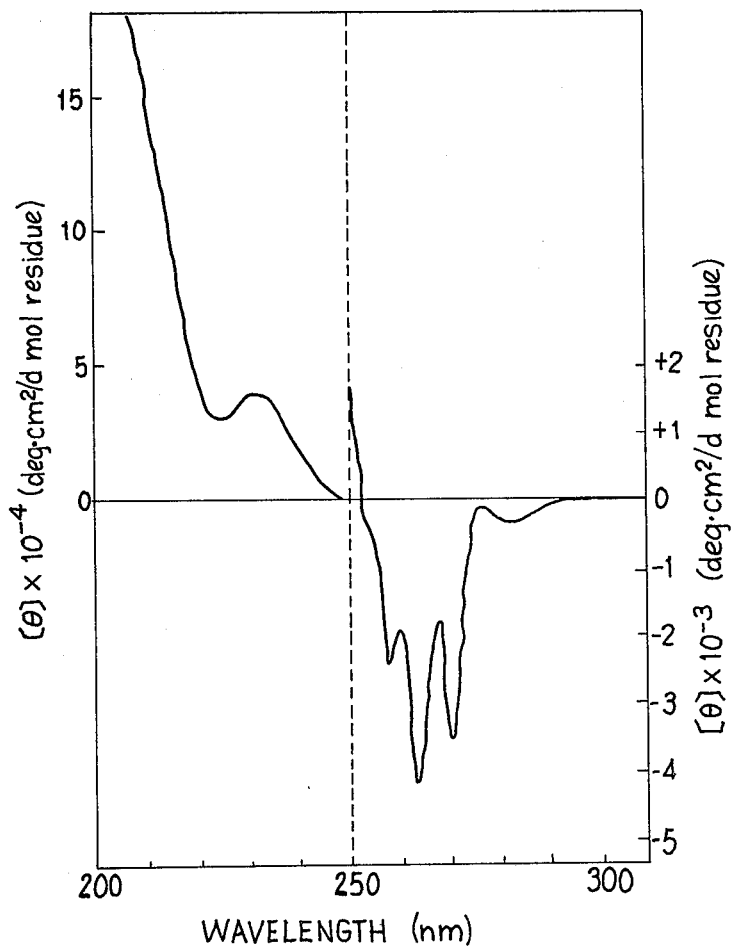

United States Patent [19]
Yuki et al.

[11] Patent Number: 4,473,690

[45] Date of Patent: Sep. 25, 1984

[54] ORGANIC POLYMERS OF METHACRYLATE ESTERS

[75] Inventors: Heimei Yuki, Sakai; Yoshio Okamoto, Amagasaki, both of Japan

[73] Assignee: Daicel Chemical Industries, Ltd., Sakai, Japan

[21] Appl. No.: 389,631

[22] Filed: Jun. 16, 1982

[30] Foreign Application Priority Data

Jun. 19, 1981 [JP] Japan .................................. 56-94875

[51] Int. Cl.$^3$ ........................ C08F 20/12; C08F 20/34
[52] U.S. Cl. .................................... 526/265; 526/284; 526/313; 526/326
[58] Field of Search ................ 526/265, 284, 313, 326

[56] References Cited

U.S. PATENT DOCUMENTS

| | | | |
|---|---|---|---|
| 3,004,957 | 10/1961 | Lynn ................................... | 526/265 |
| 3,280,087 | 10/1966 | Natta et al. ......................... | 526/326 |
| 3,645,988 | 2/1972 | Hammer et al. .................... | 526/265 |
| 4,375,495 | 0/1983 | Yuki et al. ........................... | 428/402 |

OTHER PUBLICATIONS

J. Pol. Sci. (Part B), vol. 6, pp. 753–755, (1968).

*Primary Examiner*—Harry Wong, Jr.
*Attorney, Agent, or Firm*—Flynn, Thiel, Boutell & Tanis

[57] ABSTRACT

A new organic polymer useful for the optical resolution or solvent fractionation is provided. The organic polymer is a homopolymer or copolymer comprising mainly a specific methacrylate ester constitutional unit and having (+) or (−) optical rotation and, therefore, an optical activity.

5 Claims, 2 Drawing Figures

ORGANIC POLYMERS OF METHACRYLATE ESTERS

The present invention relates to new polymers and copolymers which are useful as separating agents in the optical resolution or solvent fractionation.

The inventors previously disclosed optically active high molecular substances containing triphenylmethyl methacrylate as a constitutional unit. After further investigations, the inventors have found other high molecular substances.

The present invention provides polymers and copolymers containing a specific methacrylate ester as a main constitutional unit. More particularly, the present invention provides polymers characterized by containing a main constitutional unit of the general formula:

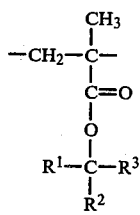

wherein $R^1$, $R^2$ and $R^3$ may be the same or different and each represent

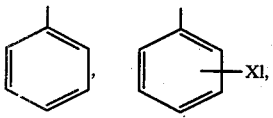

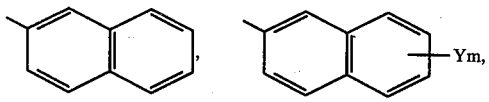

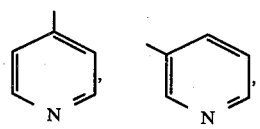

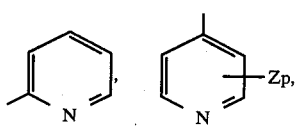

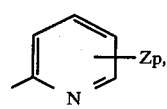

X, Y and Z represent an alkyl, alkoxy or aromatic group and l, m and p represent the number of each substituent which is an integer of 1 to 3, with the proviso that all of $R^1$, $R^2$ and $R^3$ should not represent

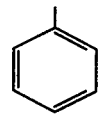

at the same time.

The above-mentioned high molecular compounds include a racemic modification in addition to (+) and (−) compounds. When the racemic modification is resolved into (+) and (−) compounds, they exhibit an optical activity and can be used as separating agents. In these optically active polymers and copolymers, those having (+) or (−) optical rotation and, therefore, an optical activity can be used as separating agents having a particularly excellent performance.

In the above-mentioned, optically active polymers and copolymers of the present invention, an asymmetric conformation (supposingly, a mainly clockwise or counterclockwise spiral structure) is maintained and, therefore, the polymer molecule has a molecular dissymmetry to exhibit an optical rotatory power probably due to the dissymmetry.

For the reasons described above, the new high molecular compounds of the present invention are useful as optical resolving agents. Racemic compounds such as α-substituted benzyl alcohol, α-phenylethylamine, Tröger's base and hydrocarbons which could not be easily optically resolved in the prior art such as helicenes can be optically resolved easily and clearly according to the chromatography using the new high molecular compounds of the present invention.

The new high molecular compounds can be used as a site of asymmetric synthesis by incorporating them in a synthesis reaction system.

An indispensable monomer forming the above-mentioned constitutional unit used for the production of the high molecular compound of the present invention is $CH_2=C(CH_3)COOCR^1R^2R^3$. Various other copolymerizable monomers are also used for the production of the high molecular compound of the invention. The indispensable monomer can be produced easily by a known method. For example, it can be obtained by reacting silver methacrylate with $Cl-CR^1R^2R^3$ in ether. The detailed reaction conditions are shown in N. A. Adrova and L. K. Prokhorova, Vysokomol. Soedin. 3, 1509 (1961). The indispensable monomers may be used either alone or in the form of a mixture of two or more of them in the polymerization. The mixing ratio can be selected arbitrarily.

Figure 2:
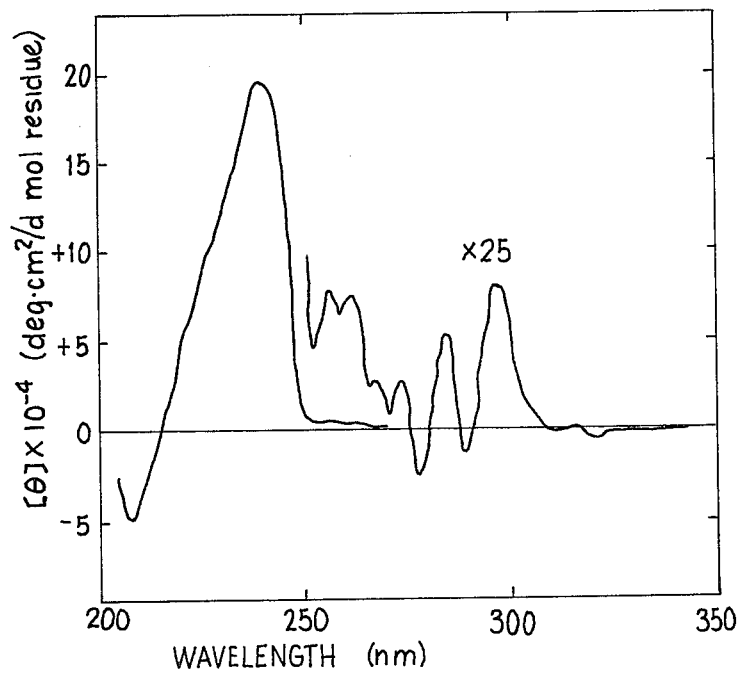

FIGS. 1 and 2 show physical properties of polymers of the present invention.

More particularly, FIGS. 1 and 2 show CD spectra of the polymers obtained in Examples 4 and 8, respectively.

The monomer used in the present invention has the following general formula:

$$CH_2=C(CH_3)COOCR^1R^2R^3$$

wherein $R^1$, $R^2$ and $R^3$ may be the same or different and each represent

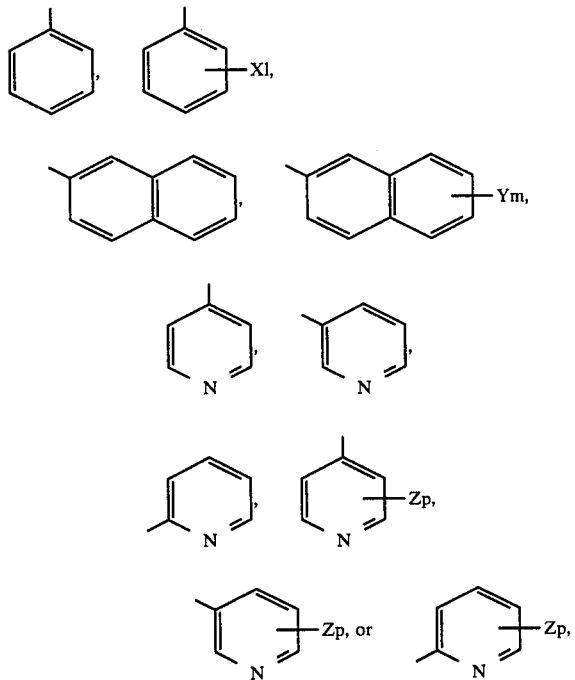

X, Y and Z represent an alkyl, alkoxy or aromatic group and l, m and p represent the number of each substituent which is an integer of 1 to 3, with the proviso that all of $R^1$, $R^2$ and $R^3$ should not represent

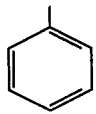

at the same time.

The above-mentioned alkyl group and alkoxy group have preferably 1 to 20 carbon atoms, especially 1 or 2 carbon atoms. The aromatic group is preferably phenyl or benzyl.

The monomers used for producing the copolymers of the present invention include the above-mentioned, indispensable monomers as well as co-monomers such as triphenylmethyl methacrylate and N,N-disubstituted acrylamide. The indispensable monomer may be mixed with the co-monomer in a desired ratio. The mixture may contain other copolymerizable monomers as further co-monomers in an amount not deteriorating the optical activity. The copolymerizable monomer content is up to 20 molar %. As the copolymerizable monomers, there may be mentioned, for example, styrene derivatives, conjugated dienes, methacrylate esters and methacrylonitrile. As a matter of course, the copolymers include block copolymer and graft copolymer. Though they per se cannot constitute an optically active polymer, they do not deteriorate the optical activity of the copolymer even if they are used as a constituent of the copolymer of the present invention.

The high molecular substance of the present invention can be produced by polymerizing the above-mentioned monomer or monomer mixture. A method of producing a racemic polymer is different from that of producing an optically active polymer having (+) or (−) optical rotation.

The racemic polymer may be obtained generally by an ionic polymerization carried out in a solvent such as toluene or THF in the presence of an alkyllithium at temperature of −98° C. to −60° C.

For the production of the optically active, new high molecular substance of the present invention, an optically active anionic catalyst is used as a polymerization initiator in the ionic polymerization.

The optically active anionic catalysts herein include alkali metal-containing, optically active organic compounds and complexes comprising an organic alkali metal compound and an optically active organic compound capable of coordinating with the organic alkali metal compound.

As preferred examples of the anionic catalysts, there may be mentioned lithium (R)- or (S)-N-(1-phenylethyl)anilide and complexes of (+) or (−)-sparteine or its derivative with an alkyllithium such as (−)-sparteine-n-BuLi, (−)-6-ethylsparteine-n-BuLi, (+)-6-benzylsparteine-n-BuLi and (−)-dihydrosparteine-n-BuLi. As other alkyllithiums, there may be mentioned, for example, t-butyllithium and 1,1-diphenylhexyllithium.

Lithium (R)-N-(1-phenylethyl)anilide was synthesized by reacting (R)-N-(1-phenylethyl)aniline with n-BuLi. An enantiomer of this compound is also usable.

(−)-Sparteine-n-BuLi was prepared by mixing (−)-sparteine with n-BuLi at room temperature.

As further examples of the anionic catalysts, there may be mentioned styrene derivatives and complexes obtained from living polymers of methacrylate esters and (−) or (+) sparteine or its derivatives.

The polymerization reaction is carried out in a solvent. Any solvent in which the monomer(s) and polymer (at least in a stage of low polymer) are soluble may be used. As a matter of course, a solvent which inhibits the anionic polymerization or optically active polymerization cannot be used.

For example, when (R)-N-(1-phenylethyl)anilide is used as the polymerization initiator, there may be used as the solvent benzene, toluene, tetrahydrofuran (THF), dioxane, dimethoxyethane, diethyl ether, pyridine, tetrahydropyran, dimethyl sulfoxide (DMSO) or dimethylformamide (DMF).

When (−)-sparteine-n-BuLi is used as the polymerization initiator, there may be used as the solvent benzene, toluene, dioxane, diethyl ether, hexane/benzene mixture or hexane/toluene mixture but THF cannot be used.

The polymerization temperature is in the range of −98° C. to +60° C., preferably −78° C. to −40° C.

It is preferred to block the terminal of the new high molecular substance of the present invention with, for example, an alcohol after completion of the reaction, since it is a living polymer.

The polymer thus synthesized in the presence of the optically active anionic catalyst has either (+) or (−) optical rotation determined by an ordinary method. The polymer has a degree of polymerization as determined by gel permeation chromatography (GPC method) of at least 5.

The degree of polymerization of a soluble polymer can be determined directly by GPC method. However, the degree of polymerization of an insoluble polymer is determined by hydrolyzing the polymer into polymethacrylic acid, methyl-esterifying the polymethacrylic acid to form polymethyl methacrylate and measuring the degree of polymerization thereof.

The optically active, high molecular substance of the present invention can be produced by the optical resolution of a racemic modification with the new polymer of the present invention. According to this method, the polymer having an opposite optical activity can be obtained advantageously. For example, a racemic modification can be resolved with optically active triphenylmethyl methacrylate by a method disclosed in the specification of Japanese Patent Application No. 19555/1970.

In the present invention, the above-mentioned, optically active organic polymer can be supported on a carrier to remarkably improve the resolution effect.

As fixed bed carrier or support for the above-mentioned purpose, there may be used any filler capable of coating the organic polymer of the present invention.

As the filler, there may be mentioned an inorganic filler such as silica gel, alumina or glass beads and organic adsorptive filler comprising a polymer such as polystyrene, polyamide or polyacrylate.

The above-mentioned fixed bed carrier may be pretreated if necessary. As the pre-treatment, there may be mentioned, for example, the treatment with silane.

The fixed bed support can be impregnated with the organic polymer of the present invention by physical coating or chemical bonding method.

The coating is effected by, for example, dissolving the resulting organic polymer in a solvent, adding the solution to the fixed bed support and distilling out the solvent to dryness.

Further, the polymerization reaction may be carried out in the presence of the fixed bed filler.

As the fixed bed support, it is preferred to select a substance which does not modify the organic polymer.

A support having a suitable porosity is preferred.

The amount of the organic polymer to be incorporated in the fixed bed carrier is 0.01 to 100 wt.%.

As a preferred fixed bed carrier, there may be mentioned a wholly porous, finely divided filler having an average particle diameter of 1 $\mu$m to 1 mm and an average pore diameter of 100 to 5,000 Å.

SYNTHESIS EXAMPLE 1

Diphenyl(4-pyridyl)methyl methacrylate (monomer):
(1) Synthesis of diphenyl(4-pyridyl)methyl chloride:

92.1 g (0.353 mol) of diphenyl(4-pyridyl)methyl alcohol recrystallized from chloroform and 800 ml of simple-distillation benzene were charged in a 2-l three-necked flask provided with a stirrer and reflux condenser. The mixture was treated at 50° C. to form a suspension. 29.6 ml (0.407 mol) of thionyl chloride was poured in the suspension and the mixture was stirred under reflux for 1 h. The resulting solution was cooled to room temperature. 72.5 ml (0.522 mol) of triethylamine was added thereto and the mixture was stirred for 7 h. The reaction solution was filtered and the filtrate was concentrated to obtain crude diphenyl(4-pyridyl)methyl chloride.

Yield: 94.1 g (95%)
Melting point: 84.5°–86.5° C.

(2) Synthesis of diphenyl(4-pyridyl)methyl methacrylate (monomer):

The reaction was carried out while shielding the light. 71.7 g (0.372 mol) of silver methacrylate and 300 ml of simple-distillation ether were charged in a 2-l three-necked flask provided with a stirrer, reflux condenser and dropping funnel. 83.9 g (0.300 mol) of diphenyl(4-pyridyl)methyl chloride prepared as above and dissolved in simple-distillation ether was added dropwise to the solution with stirring under reflux over 1 h. After reflux for 5 h, the reaction liquid was filtered and the filtrate was concentrated and dried to obtain a crude crystalline monomer. The product was identified from NMR spectrum and IR spectrum.

IR (Nujol): 1737 (C=O), 1640 (C=C)cm$^{-1}$.
NMR (CDCl$_3$, TMS): δ1.99 (s, 3H), 5.63 (s, 1H), 6.23 (s, 1H), 7.3 (m, 12H), 8.5 (d, 2H).
Yield: 87.2 g (88%).

(3) Purification of the monomer:

A part of the crude crystalline monomer comprised a methacrylate salt. For the purpose of removing this salt, the following treatment was effected: 87.2 g of the crude crystalline monomer was dissolved in 1.8 l of ether and 500 ml of saturated aqueous Na$_2$CO$_3$ soluton was added thereto to effect the extraction. The ethereal layer was dehydrated over MgSO$_4$, concentrated and recrystallized from hexane to obtain 37.2 g of the purified monomer.

Melting point: 98.5°–99.5° C.

In the polymerization, the purified monomer further recrystallized from a solution in toluene/hexane (1:1) was used.

Melting point: 101.0°–101.5° C.
Elementary analysis: Found: C: 80.35%, H: 5.81%, N: 4.46%, (Calcd: C: 80.22%, H: 5.81%, N: 4.25).

EXAMPLES 1-3

The purified monomers obtained in Synthesis Example 1 was homopolymerized under the following conditions:

In all cases, the polymerization reaction was carried out under nitrogen stream in an ampoule-type glass polymerization tube. The polymerization was terminated with a small quantity of methanol. The polymer was precipitated in a large quantity (10–15 times as much) of methanol.

(i) Polymerization solvent:
Toluene purified by an ordinary method was used.
(ii) Initiator:
n-Butyllithium (BuLi):
n-Butyllithium was prepared by reacting n-butyl chloride with metallic lithium in n-heptane according to a Ziegler process.
t-Butyllithium (t-BuLi):
t-Butyllithium was prepared by reacting t-butyl chloride with lithium in petroleum ether under argon stream.
1,1-Diphenylhexyllithium (DPHLi):
1,1-Diphenylhexyllithium was prepared by reacting n-butyllithium with 1,1-diphenylethylene in toluene at 40° C. for 72 h.
(iii) Ligand:
(−)-Sparteine (Sp):
Commercially available L-(−)-sparteine (a product of SIGMA Co.) was distilled under reduced pressure and dissolved in toluene.
(iv) Preparation of catalyst:
Components (ii) and (iii) were mixed in a molar ratio of 1:1.2 in toluene to form a catalyst.
(v) Concentrations of reagents used:
Monomer: 1 g
Toluene: 10 ml
Catalyst: 5 molar % based on the monomer The results obtained in the homopolymerization in the ampoule-type glass polymerization tube are shown in Table 1.

TABLE 1

| Ex. | Catalyst and polymerization initiator | Polymerization temp. (°C.) | Yield (%) | Tetrahydrofuran-soluble fraction (%) | $[\alpha]_{546}^{25(a)}$ | Tetrahydrofuran-insoluble fraction (%) | $[\alpha]_{546}^{25(b)}$ |
|---|---|---|---|---|---|---|---|
| 1 | Sp-BuLi | −78 | 87 | 0 | — | 87(c) | +27° |
| 2 | Sp-t-BuLi | −78 | 84 | 5 | −11° | 79 | +23° |
| 3 | Sp-DPHLi | −78 | 83 | 4 | −16° | 79 | +25° |

(Notes)
(a)Determined in tetrahydrofuran,
(b)Determined in CHCl$_2$CO$_2$H, and
(c)[η] = 0.19 dl/g (30° C., in CHCl$_2$CO$_2$H).

Physical properties of the polymer were determined by the following methods:

(i) Measurement of optical rotation:

The optical rotation was measured with a digital polarimeter (DIP-181; a product of Nihon Bunko Co.) at 25° C. at 546 nm or 589 (D)nm.

(ii) Measurement of viscosity:

The viscosity was measured with an Ubbelohde's viscometer at 30° C.

EXAMPLES 4-6

The purified monomer obtained in Synthesis Example 1 was copolymerized with triphenylmethyl methacrylate in the same manner as in Example 1 in the ampoule-type glass polymerization tube.

The concentrations of the reagents used were as follows:

|  | Copolymerization (a) Examples 4 & 5 | Copolymerization (b) Example 6 |
|---|---|---|
| Diphenyl(4-pyridyl)methyl methacrylate | 1 g | 1 g |
| Triphenylmethyl methacrylate | 1 g | 0.25 g |
| Toluene | 30 ml | 20 ml |

TABLE 2

| Ex. | Amounts of monomer and solvent | Polymerization time (hr) | Yield (%) | Monomer(a) ratio | Fraction soluble in tetrahydrofuran in the copolymer (%) | $[\alpha]_{546}^{25(b)}$ | Fraction insoluble in tetrahydrofuran in the copolymer (%) | $[\alpha]_{546}^{25(c)}$ |
|---|---|---|---|---|---|---|---|---|
| 4 | (A) | 24 | 91 | 0.9 | 66 | +360° | 25 | 0° |
| 5 | (A) | 26(d) | 96 | 1.0 | 38 | +209° | 58 | +2° |
| 6 | (B) | 26(e) | 76 | 5.5 | 1 | −60° | 75 | +43° |

(Notes)
(a)Diphenyl(4-pyridyl)methyl methacrylate/triphenylmethyl methacrylate,
(b)Determined in tetrahydrofuran,
(c)Determined in CHCl$_2$CO$_2$H,
(d)First, triphenylmethyl methacrylate was polymerized for 2 h and then the copolymerization was carried out for 24 h.
(e)Triphenylmethyl methacrylate was polymerized for 24 h and then the copolymerization was carried out for 24 h.

CD spectrum of the polymer obtained in Example 4 is shown in FIG. 1. The CD spectrum was obtained in tetrahydrofuran at room temperature. The peak around 283 nm was due to a pyridyl group. It is apparent that also the pyridyl group causes the asymmetry.

The CD spectrum was obtained by means of a Circular Dichroism Dispersion Meter J-40 (a product of Nihon Bunko Co.) at room temperature.

SYNTHESIS EXAMPLE 2

Diphenyl-2-naphthylmethyl methacrylate (monomer):

49.7 g (0.289 ml) of 2-naphthoic acid, 500 ml (12.4 mol) of methanol and 50 g of sulfuric acid were refluxed for 2 h. After completion of the reaction, the product was poured in a cold, dilute aqueous sodium hydroxide solution (25.1 g of NaOH+1 l of water). Crystals thus precipitated were filtered out, dried and recrystallized from methanol.

Yield: 48.8 g (91.7%)

Separately, 50.2 ml (0.476 mol) of bromobenzene and 90 ml of purified tetrahydrofuran were added dropwise to 12.0 g (0.494 mol) of magnesium and 90 ml of purified tetrahydrofuran. A solution of 40.0 g (0.215 mol) of methyl naphtoate obtained as above in 200 ml of tetrahydrofuran was added dropwise to the resulting phenylmagnesium bromide. Thereafter, the mixture was refluxed for 4 h and poured slowly in dilute hydrochloric acid (17.9 ml of 12N HCl+415 ml of water) under coding. After the extraction with ether, the ethereal layer was dried and ether was distilled. The resulting crude, crystalline diphenyl-2-naphthylcarbinol was recrystallized from ethanol.

Yield: 45.4 g (68.1%)
Melting point: 115.0°-115.8° C.

16.4 g (53.0 mmol) of diphenyl-2-naphthylcarbinol was dried and then dissolved in 80 ml of benzene. 5 ml of purified thionyl chloride was added to the solution under stirring and the mixture was refluxed for 6 h. Benzene was distilled out to obtain 17.6 g of crude, crystalline chloro-diphenyl-2-naphthylmethane. The product was recrystallized repeatedly from n-hexane.

Yield: 11.4 g (77.2%)
Melting point: 92.0°-93.0° C.

Then, 7.98 g (41.3 mmol) of silver methacrylate was charged in a reactor and suspended in 27 ml of dry ether. A solution of 11.2 g (34.1 mmol) of chloro-diphenyl-2-naphthylmethane obtained as above in 100 ml of dry ether was added dropwise to the suspension under stirring. After completion of the addition, the mixture was refluxed for about 4 h and then filtered to obtain an ethereal solution, from which ether was distilled out to obtain 9.80 of crude crystals. The crude crystals were recrystallized repeatedly from n-hexane to obtain the purified monomer.

Yield: 5.99 g (52.1%)
Melting point: 107°-110° C.
Results of elementary analysis:

|  | C % | H % |
|---|---|---|
| Found: | 86.12 | 5.86 |
| Calcd: | 85.68 | 5.86 |

In IR spectrum, a high peak due to an ester carbonyl group was observed at 1735 cm$^{-1}$. In $^1$H-NMR spectrum (100 MHz) in chloroform solution, peaks due to a vinyl group were observed at 5.48 and 6.16 ppm, a peak due to a methyl group was observed at 1.92 ppm and peaks due to aromatic rings of phenyl and naphthyl groups were observed at 7.08 to 7.72 ppm. From the integrated curve, it was confirmed that the monomer was pure.

EXAMPLES 7-8

The monomer obtained in Synthesis Example 2 was homopolymerized.

In all cases, the polymerization reaction was carried out under nitrogen stream in an ampoule-type glass polymerization tube. A given amount of the monomer was dissolved in a solvent in the polymerization tube. The temperature of the solution was set at a given point. A catalyst previously prepared at room temperature was added to the solution to initiate the polymerization. After carrying out the polymerization for a given period of time, the polymerization was terminated with a small quantity of methanol. The polymer was precipitated in a large quantity (10 times as much) of methanol. The polymer was immediately separated out by the centrifugation. The methanol-insoluble fraction was dried to a given amount.

The results of the polymerization of 1.0 g (2.6 mmol) of the monomer carried out in the presence of 0.13 mmol of BuLi catalyst in 10 ml of toluene are shown in Table 3.

TABLE 3

| Ex. | Catalyst$^{(a)}$ | Polymerization temp. (°C.) | Polymerization time (hr) | Yield (%) | $[\alpha]_D^{25(b)}$ (Degree) | Degree$^{(c)}$ of polymerization |
|---|---|---|---|---|---|---|
| 7 | Sp-BuLi | −78 | 120 | 88 | +299 | 45 |
| 8 | BzSp-BuLi | −78 | 120 | 100 | +378 | 50 |

(a) Catalyst:

Sp-BuLi: (−)-Sparteine/n-butyllithium complex:

A solution of n-butyllithium (BuLi) in heptane was mixed with a solution of (−)-sparteine (Sp) in toluene immediately before the polymerization at room temperature (molar ratio of BuLi/Sp=1/1.2)

BzSp-BuLi-(+)-6-Benzylsparteine/n-butyllithium complex:

A solution of BuLi in heptane was mixed with a solution of (+)-6-benzylsparteine in toluene at room temperature immediately before the polymerization (molar ratio of BuLi/BzSp=1/1.2).

(b) Measured in THF.

(c) Degree of polymerization was determined according to GPC.

In GPC, there were used FLC-10 high-performance liquid chromatograph (a product of Nihon Bunko Co.), Shodex GPC A-80M column, UV-254-II detector and THF (solvent). The molecular weight was calibrated using standard polystyrene.

The results of the elementary analysis of the polymer ($C_{27}H_{22}O_2$)$_n$ obtained in Example 7 were as follows:

|  | C % | H % |
|---|---|---|
| Found: | 84.81 | 5.96 |
| Calcd: | 85.68 | 5.86 |

CD spectrum of the polymer obtained in Example 8 is shown in FIG. 2. In the CD spectrum of triphenylmethyl methacrylate polymer, a great, positive peak due to a phenyl group is recognized at 208 nm. However, the polymer obtained in Example 8 had a negative value. The peaks at 250 to 320 nm are due to a naphthyl group. From these facts, it is supposed that in the polymer obtained in Example 8, the naphthyl group is placed under an asymmetrical condition and, therefore, greatly contributes to the optical rotation.

REFERENTIAL EXAMPLE 1

Resolution with (+)-poly(diphenyl-2-naphthylmethyl methacrylate):

Wholly porous silica gel having a large pore diameter (LiChrospher SI 1000; a product of Merck Co.) was treated with a large excess amount of diphenyldichlorosilane. 0.55 g of the polymer synthesized in Example 8 was supported on 2.50 g of the silane-treated silica gel using tetrahydrofuran to obtain a filler.

The filler (about 2.5 g) was charged in a stainless steel column having a length of 25 cm and an inner diameter of 0.46 cm by the slurry process. The racemic resolution was effected according to high-performance liquid chromatography. In the resolution, there was used a TRI ROTAR-II Chromatograph (a product of Nihon Bunko Co.), UV-100-III detector and methanol (eluent). The flow velocity of methanol was 0.50 ml/min. The void volume of the column was 3.35 ml.

| Racemic modification | Volume ratio (k') | | Resolution coefficient (α) | Degree of resolution (Rs) |
|---|---|---|---|---|
| | Antipode of short retention time | Antipode of long retention time | | |
| 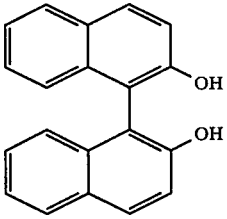<br>2,2'-Dihydroxy-1,1'-binaphthyl | 0.61 | 0.79 | 1.30 | 0.52 |
| 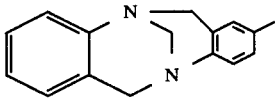<br>Troger's base | 1.31 | 1.61 | 1.24 | 0.72 |
| 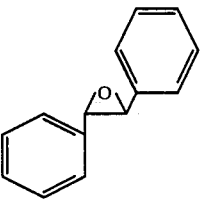<br>trans-Stilbene oxide | 1.09 | 1.87 | 1.72 | 2.20 |

REFERENTIAL EXAMPLE 2

Resolution with optically active triphenylmethyl methacrylate/diphenyl(4-pyridyl)methyl methacrylate copolymer:

Triphenylmethyl methacrylate/diphenyl(4-pyridyl)methyl methacrylate copolymer* obtained in Example 4 was supported on silane-treated LiChrospher SI 1000 in an amount of 22% in the same manner as in Referential Example 1. The resolution conditions according to the high-performance liquid chromatography were the same as in Referential Example 1.

*Random copolymer obtained by an ordinary method: [DPyMMA]/[TrMA]=0.9, [α]$_{546}^{25}$+360° (THF)

REFERENTIAL EXAMPLE 3

Wholly porous silica gel having a large pore diameter (LiChrosper SI 1000; a product of Merck Co.) was treated with a large excess amount of diphenyldichlorosilane. 0.55 g of triphenylmethyl methacrylate/diphenyl(4-pyridyl)methyl methacrylate copolymer {[DPyMMA]/[TrMA]=0.9, [α]$_{546}^{25}$+360° (THF)} was supported on 2.50 g of the silane-treated silica gel using tetrahydrofuran. The filler (about 2.5 g) was charged in a stainless steel column having a length of 25 cm and an inner diameter of 0.46 cm by the slurry process. The resolution was effected by means of a high-performance liquid chromatograph (TRIROTAR-II; a product of Nihon Bunko Co.). Isopropanol/hexane (volume ratio: 5/95) was used as a solvent. The flow rate was 0.50 ml/min. The results are shown in Table 5.

TABLE 4
Resolution with triphenylmethyl methacrylate/diphenyl(4-pyridyl)methyl methacrylate copolymer

| No. | Sample | K'$_1$ | K'$_2$ | α | R$_s$ |
|---|---|---|---|---|---|
| 1 | 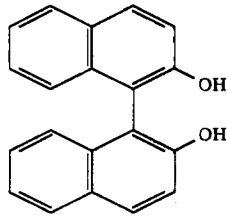 | 1.10 | 2.14 | 1.94 | 1.57 |
| 2 | 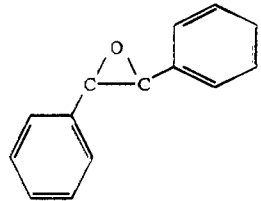 | 1.44 | 0.60 | 1.38 | 1.99 |
| 3 | 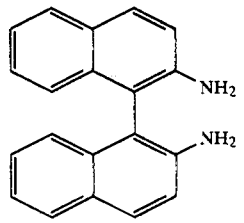 | 1.17 | 2.66 | 2.27 | 1.03 |

TABLE 4-continued

Resolution with triphenylmethyl methacrylate/
diphenyl(4-pyridyl)methyl methacrylate copolymer

| No. | Sample | K′₁ | K′₂ | α | R_s |
|---|---|---|---|---|---|
| 4 | (2,2′-dibromo-1,1′-binaphthyl) | 1.25 | 1.57 | 1.26 | 0.92 |
| 5 | (2,2′-dimethyl-1,1′-binaphthyl) | 0.09 | 0.22 | 2.46 | 0.73 |
| 6 | (tetra-O-benzoyl sugar structure) | 0.94 | 1.35 | 1.44 | 1.23 |

TABLE 5

| Sample | k′₁ | k′₂ | α | R_s |
|---|---|---|---|---|
| (9-anthryl-CF₃-CH-OH) | 7.57 | 8.61 | 1.14 | 1.19 |
| cyclohexane-1,2-bis(CONHφ) | 0.91 | 1.21 | 1.33 | 1.43 |
| cyclopentane-bis(CONHφ) | 3.65 | 4.08 | 1.12 | 0.93 |
| cyclobutane-bis(CONHφ) | 2.22 | 2.52 | 1.14 | 0.98 |
| cyclopropane-bis(CONHφ) | 2.10 | 3.08 | 1.46 | 2.63 |

TABLE 5-continued

| Sample | k′₁ | k′₂ | α | R_s |
|---|---|---|---|---|
| cyclopropane-CONHφ/φ | 6.83 | 7.93 | 1.16 | 1.55 |
| 6,6′-dimethyl-2,2′-bis(NHCOφ)biphenyl | 10.02 | 13.03 | 1.30 | 0.80 |

[N.B.] φ: 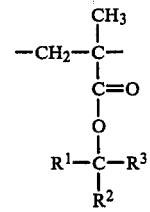

What is claimed is:

1. An organic polymer comprising a main constitutional unit of the general formula:

$$-CH_2-\underset{\underset{\underset{R^2}{|}}{\underset{R^1-C-R^3}{|}}}{\overset{\overset{CH_3}{|}}{\underset{|}{C}}}-\underset{}{\overset{}{\underset{C=O}{|}}}$$
$$\phantom{-CH_2-C-}O$$

wherein $R^1$, $R^2$ and $R^3$ may be the same or different and each represent (phenyl), (phenyl)—Xl, (naphthyl), (naphthyl)—Ym, (4-pyridyl), (3-pyridyl), (2-pyridyl), (4-pyridyl)—Zp, (3-pyridyl)—Zp, or (2-pyridyl)—Zp, X, Y and Z represent an alkyl, alkoxy or aromatic group and l, m and p represent the number of each substituent which is an integer of 1 to 3, with the proviso that all of $R^1$, $R^2$ and $R^3$ should not represent

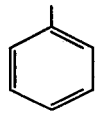

at the same time.

2. An organic polymer according to claim 1 having (+) or (−) optical rotation.

3. A polymer as claimed in claim 1 in which two of $R^1$, $R^2$ and $R^3$ are phenyl and the other is 4-pyridyl.

4. A polymer as claimed in claim 1 in which two of $R^1$, $R^2$ and $R^3$ are phenyl and the other is naphthyl.

5. A polymer as claimed in claim 1 which also contains triphenylmethyl methacrylate units.

* * * * *